US008835795B2

(12) United States Patent
Buse et al.

(10) Patent No.: US 8,835,795 B2
(45) Date of Patent: Sep. 16, 2014

(54) METHOD FOR IMPLEMENTING SPATTER-LESS WELDING

(75) Inventors: Petru Sorin Buse, Kitchener (CA); Ryan Robert Westbrook, Kitchener (CA); Larry Henan Chen, Windsor (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1472 days.

(21) Appl. No.: 12/271,107

(22) Filed: Nov. 14, 2008
(Under 37 CFR 1.47)

(65) Prior Publication Data
US 2010/0122968 A1 May 20, 2010

(51) Int. Cl.
*B23K 9/02* (2006.01)
*B23K 11/00* (2006.01)
*B23K 9/28* (2006.01)
*B23K 11/10* (2006.01)
*B23K 11/04* (2006.01)
*G05B 13/02* (2006.01)
*B23K 11/11* (2006.01)
*B23K 11/25* (2006.01)

(52) U.S. Cl.
CPC .............. *B23K 11/11* (2013.01); *B23K 11/257* (2013.01); *Y10S 901/44* (2013.01)
USPC ...... 219/108; 219/78.01; 219/86.1; 219/91.1; 219/104; 901/44; 700/28

(58) Field of Classification Search
USPC .............. 219/78.01, 80, 86.1, 87, 91.1, 91.2, 219/108, 110, 111, 117.1, 118, 127, 130.01, 219/130.32, 130.33, 130.5, 130.51, 136, 219/137 R; 901/42
See application file for complete search history.

(56) References Cited

U.S. PATENT DOCUMENTS

| | | | |
|---|---|---|---|
| 2,464,981 A | | 3/1949 | Leathers et al. |
| 2,826,674 A | | 3/1958 | Peras |
| 3,569,659 A | | 3/1971 | Benton et al. |
| 3,899,653 A | | 8/1975 | Spinnato |
| 4,024,371 A | | 5/1977 | Drake |
| 4,230,930 A | | 10/1980 | Chang et al. |
| 4,302,653 A | | 11/1981 | Denning et al. |
| 4,447,700 A | * | 5/1984 | Cohen ......................... 219/117.1 |
| 4,456,810 A | * | 6/1984 | Schumacher et al. ........ 219/110 |
| 4,678,887 A | * | 7/1987 | Nagel et al. ................. 219/117.1 |
| 4,724,294 A | * | 2/1988 | Klein ............................ 219/86.7 |

(Continued)

*Primary Examiner* — Dana Ross
*Assistant Examiner* — Gyounghyun Bae
(74) *Attorney, Agent, or Firm* — Oblon, Spivak, McClelland, Maier & Neustadt, L.L.P.

(57) ABSTRACT

A method for optimizing a schedule for impulse welding including generating a weld lobe using a preexisting welding schedule, the schedule prescribing a current, a weld time, and a pressure; identifying an operating window on the weld lobe; analyzing the operating window, the analysis including determining a maximum time range of the operating window, and determining a maximum current range of the operating window; until (i) the determined maximum time range of the operating window is greater than a predetermined percentage of the prescribed weld time of the schedule and (ii) the determined maximum current range is greater than the prescribed current of the schedule, creating additional weld lobes by varying the pressure and repeating the identifying an operating window and the analyzing the operating window steps; and selecting, within the operating window satisfying conditions (i) and (ii), a second schedule including a second weld time, a second current, and a second pressure.

10 Claims, 7 Drawing Sheets

(56) References Cited

U.S. PATENT DOCUMENTS

| | | | |
|---|---|---|---|
| 5,030,814 A | 7/1991 | Tange et al. | |
| 5,192,851 A * | 3/1993 | James et al. | 219/130.51 |
| 5,748,462 A * | 5/1998 | Moro et al. | 363/97 |
| 5,770,834 A | 6/1998 | Davis et al. | |
| 5,786,558 A * | 7/1998 | Shimada | 219/110 |
| 6,208,146 B1 * | 3/2001 | Huang et al. | 324/421 |
| 6,359,249 B1 * | 3/2002 | Brown et al. | 219/86.51 |
| 6,403,913 B1 * | 6/2002 | Spinella et al. | 219/119 |
| 2005/0184031 A1 * | 8/2005 | Sun et al. | 219/117.1 |
| 2005/0218120 A1 | 10/2005 | Shih | |
| 2007/0119823 A1 * | 5/2007 | Filev et al. | 219/110 |
| 2007/0170164 A1 * | 7/2007 | Nadzam | 219/130.51 |
| 2010/0122968 A1 * | 5/2010 | Buse et al. | 219/108 |

* cited by examiner

METHOD FOR IMPLEMENTING SPATTER-LESS WELDING

BACKGROUND OF THE INVENTION

1. Field of the Invention

The present invention relates generally to resistance welding. More particularly, the present invention is directed to generating spot weld schedules to be implemented by weld controllers.

2. Description of the Related Art

Automobile body panels are spot-welded using a welding apparatus including a robot and a spot welding servo gun coupled to a wrist portion of the robot. The spot welding servo gun has a pair of electrode tips for pressing a work piece therebetween. The electrode tips are electrically connected to a welding transformer. The welding transformer is electrically connected to a welding power source via a controller having a timer function. At least one tip of the spot welding servo gun is movably installed in a servo motor which performs position control or pressure control of the electrode tip.

Many spot welds experience expulsion. That is, molten metal is ejected from the weld decreasing the cleanliness of the mass produced automobile body and compromising the weld integrity. There are five primary causes of expulsion: (i) gun alignment, (ii) condition of the tip of the electrodes, (iii) weld schedule, (iv) misfit parts, and (v) adhesives between the parts.

SUMMARY OF THE INVENTION

It is an object of the present invention to reduce the level and frequency of expulsion during the spot welding process. To that end, the inventors studied the interaction of the five causes of expulsion and identified the most important—weld schedules were giving off too much heat and misfit parts.

To reduce the frequency of expulsions, the present invention optimizes existing welding schedules by analyzing an operating window of a weld lobe and uses impulse welding to address, among other things, the misfit parts issue.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The inventors conducted a Taguchi experiment measuring the effect and interaction of weld time, uses of impulses, part fit, pressure, pulsation, and current. The five factor experiment required $2^5$ permutations. Based on the Taguchi experiment, the inventors concluded that the interaction of current and time were dominant over the other factors. The interaction between pulse and time to address misfit parts, while not as significant as the interaction between current and time, was also found to be significant. Thus, a parameter identified by the inventors for optimization was the number of pulses in the weld time (while operating within the weld lobe). The inventors concluded from the Taguchi experiment that: (i) impulse welding should be implemented due to its effectiveness on expulsion; (ii) the top two traceable factors that affect nugget size and expulsion are current and time. Based on these conclusions, among other things, the inventors developed a methodology for spatter-less welding including optimizing a welding schedule and using impulse welding.

Figure 11:
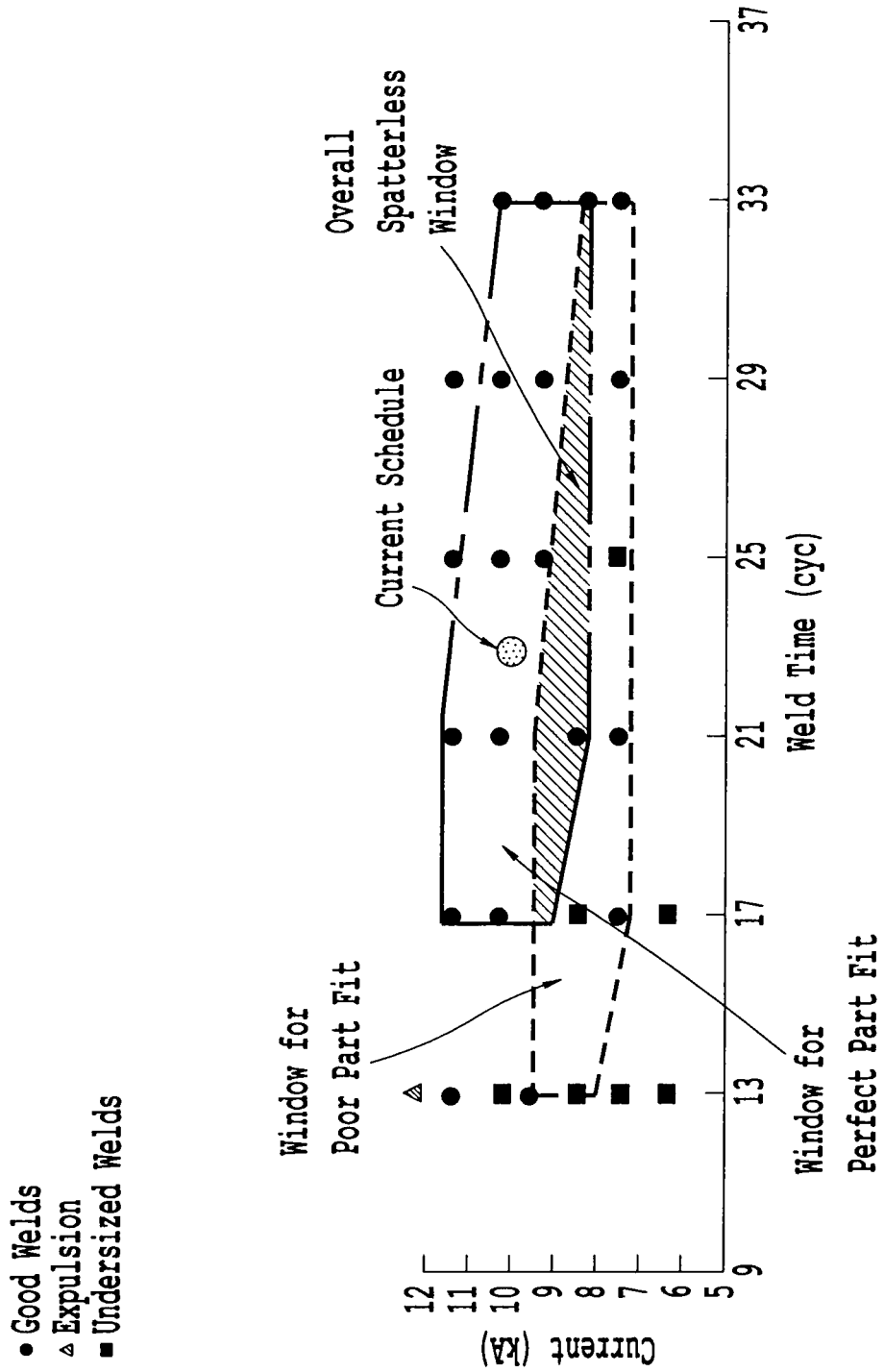
FIG. 11 illustrates a method for identifying an operating window during a part fit study.

Referring now to the drawings, wherein like reference numerals designate identical or corresponding parts throughout the several views. In developing a methodology for generating spatter-less welds which would be effective where the parts being welded may have a poor fit, the inventors created a weld lobe using a preexisting weld schedule on a perfect part fit and a weld lobe using the preexisting schedule on a poor part fit. The part fits were simulated using coupons. As can be seen in FIG. 11, weld lobes for the perfect part fit and the poor part fit were generated using a fixed pressure force of 2940 N and by varying the current and weld time. Expulsions were observed visually during the welding process. In order to identify undersized welds and good welds, the coupons were sent to a lab for a peel test.

The overlapping window illustrated in FIG. 11 where good welds were created on both the perfect part fit and the poor fit had a small tolerance for changes in current. Because in most real world applications the fit of the two parts being welded together can vary frequently (e.g., on a day to day basis) from poor to perfect, it would be difficult to operate consistently in the overlapping window identified in FIG. 11. Consequently, in order to create a better fit between the parts during the welding process and in accordance with an embodiment of the present invention, multiple impulse welding is used in lieu of conventional single pulse welding.

With conventional single pulse welding, heat greatly dissipates in the metal. In contrast, with multiple impulse welding, heat is focused on the weld reducing metal temperature and expulsion. Heat is a function of the current squared, the weld time, and the pressure.

$$Q\alpha(I^2 t)/P$$

Figure 10:
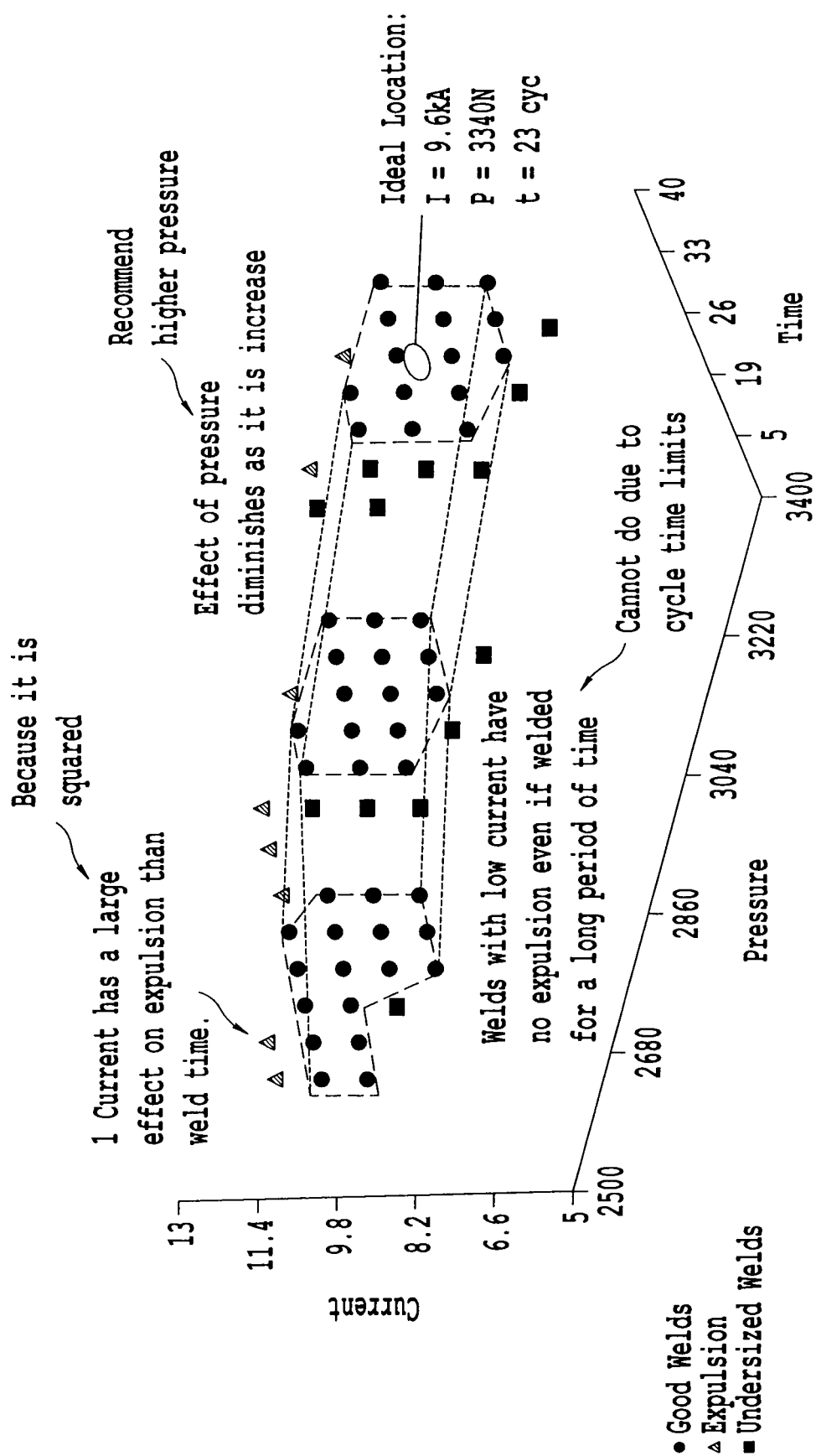
FIG. 10 illustrates a 3D weld lobe analysis.

As reflected in FIG. 10, the inventors discovered that current has a larger effect on expulsion than weld time because the heat generated is a function of the current squared. Further, the effect of pressure diminishes as it is increased. Thus, higher pressure welds are recommended. Welds with low current have no expulsion even if welded for a long period of time. However, because in most real world applications the weld time cannot be increased to preserve manufacturing efficiencies, the time parameter alone cannot be optimized.

Figure 1:
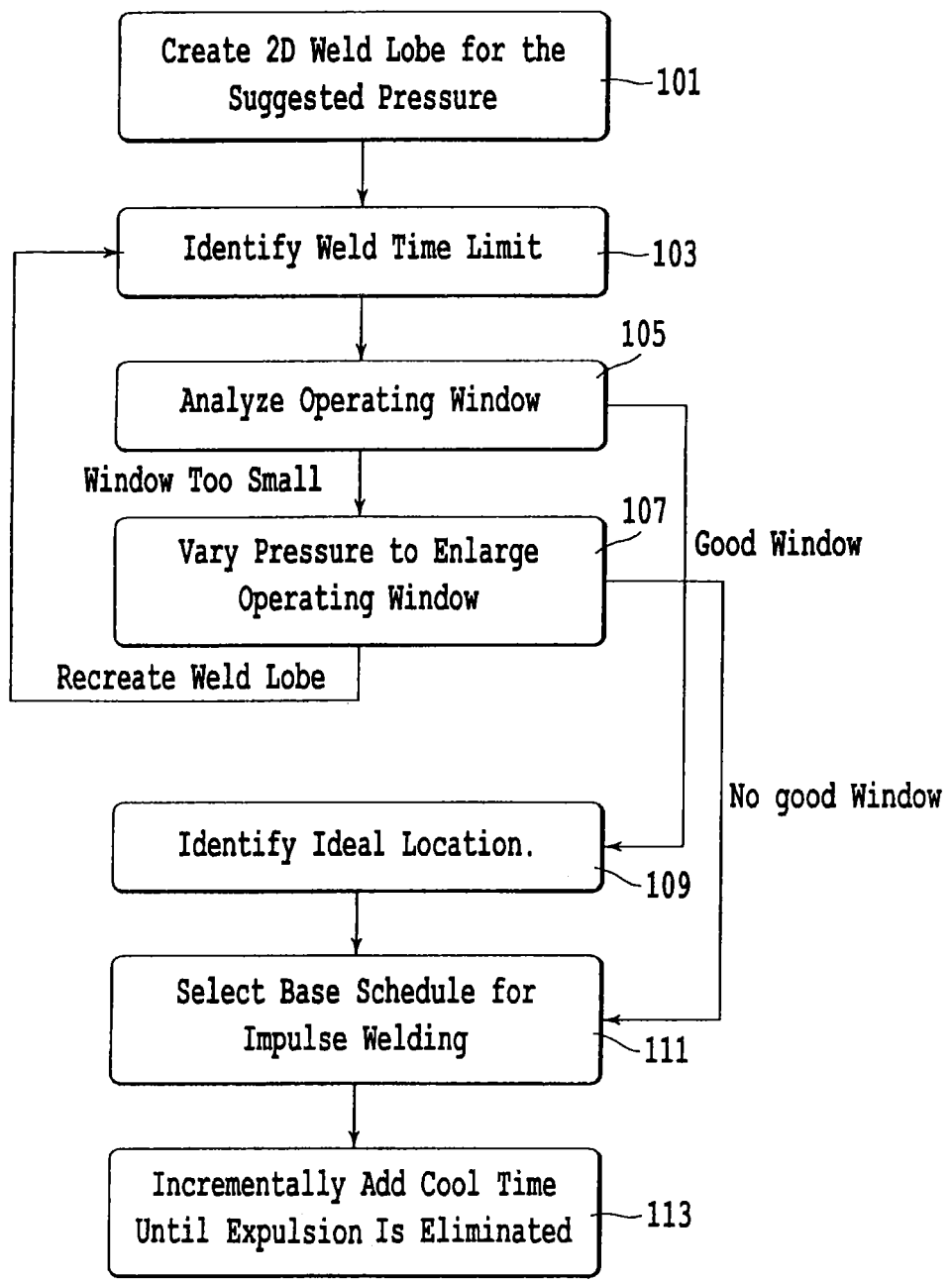
FIG. 1 is a flowchart illustrating a process for implementing a method according to the present invention.

A preferred methodology for creating an optimized weld schedule is next explained in conjunction with FIG. 1. Although specific values for current, pressure, and time are identified, the scope of the invention is not intended to be limited to such an implementation.

Figure 2:
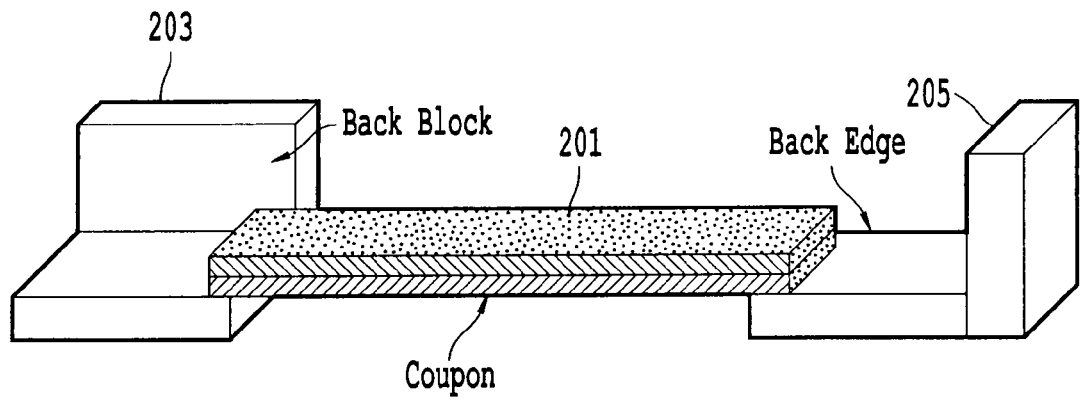
FIG. 2 illustrates a setup for creating a weld lobe according to the present invention.

In step 101, a weld lobe for an existing weld schedule is generated. Welding schedules typically include a prescribed current, time, and pressure for the weld. According to an embodiment of the present invention, step 101 includes the following sub-steps. First, taking two metal coupons 201 of the appropriate type and thickness associated with the existing weld schedule and clamping them down to back blocks 203 and 205 as shown in FIG. 2. The coupons may have to be turned slightly to ensure that one end of the coupons 201 touches a back block and the other end of the coupons 201 does not. The clamps should not touch the fixture where it is not insulated or the process will ground out.

To generate the data to create the weld lobe, for a first weld, apply the suggested pressure of the existing schedule, apply half the suggested weld time found in the existing schedule, apply 2 kA plus the prescribed current found in the existing schedule, and record expulsion whether an expulsion occurs (Yes/No). Increments of current smaller or larger than 2 kA can be added to the prescribed current dependent on the number of data points wanted.

For the next few welds, hold the current and the pressure constant, vary the prescribed weld time in predetermined increments (e.g., prescribed total weld time/6), and increase the weld time by the calculated interval for each weld until either expulsion occurs or a time cap is reached. According to an embodiment of the invention, the time cap can be established at for example the prescribed weld time plus (6 to 10) predetermined increments. Record expulsion data for each weld. In a preferred embodiment, decrease the current (originally the prescribed current plus 2 kA) by 1 kA, reduce the weld time back to half of the prescribed weld time and repeat the process described in this paragraph until the current being applied is the prescribed current minus 2 kA.

Figure 3:
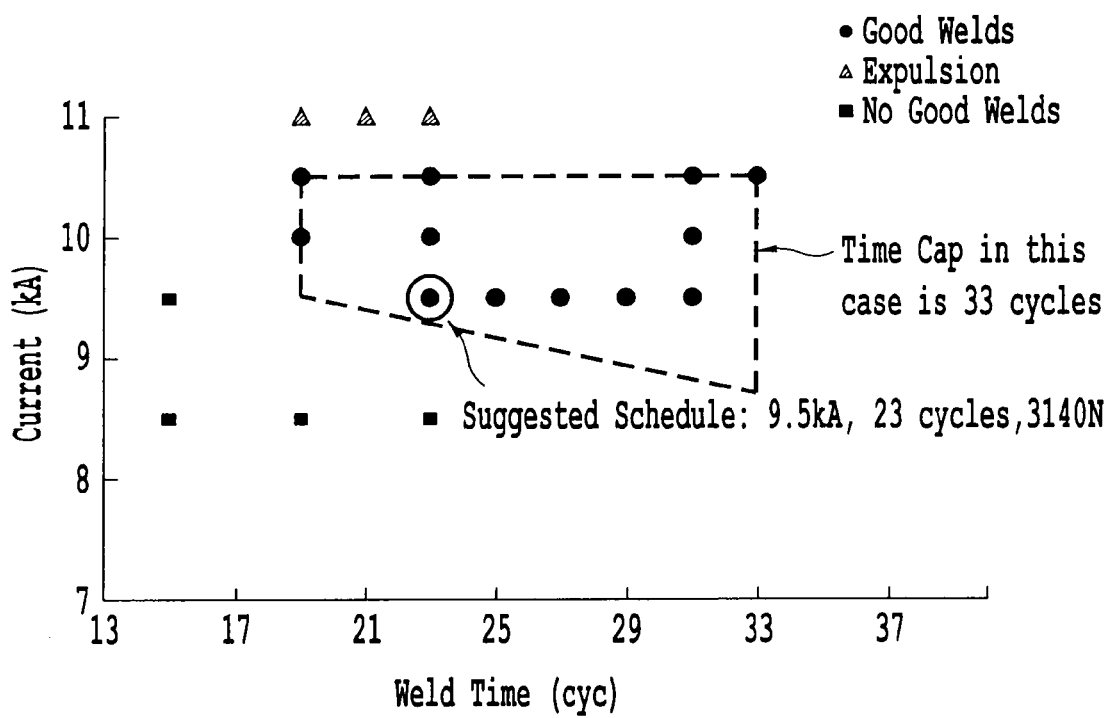
FIG. 3 illustrates a weld lobe created using the setup illustrated in FIG. 2.

After all of the welds have been created, perform peel tests on the welds to check weld quality. The quality of the welds should be recorded as pass or fail. A plot of the current versus time data should be generated, using a triangle, for example, to represent expulsions, circles, for example, to represent good welds without expulsion, and an "x" or a square, for example, to represent bad welds. See FIG. 3.

Figure 4:
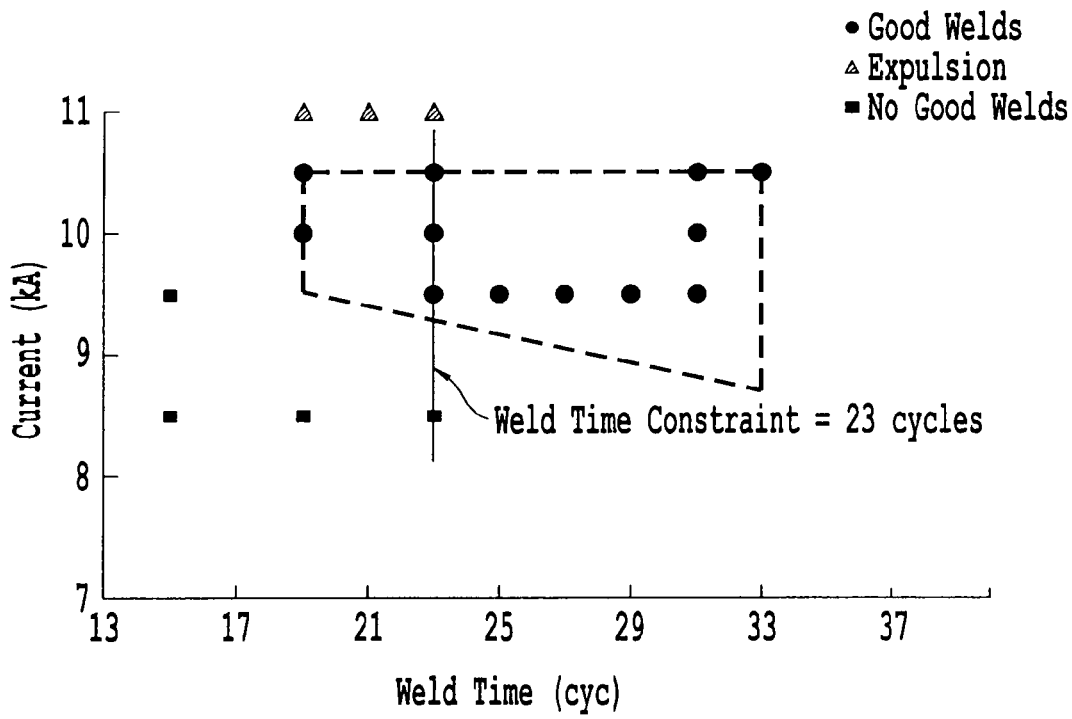
FIG. 4 illustrates a method for identifying on the weld lobe of FIG. 3 a weld time constraint.

In step 103, draw the prescribed weld time on the generated weld lobe. See FIG. 4.

In step 105, an operating window is identified. As discussed above, the inventors performed a part fit study to investigate the effect of poor part fit on spot welds, and discovered that part fit had a significant impact on the operating window of a spot weld.

Figure 5:
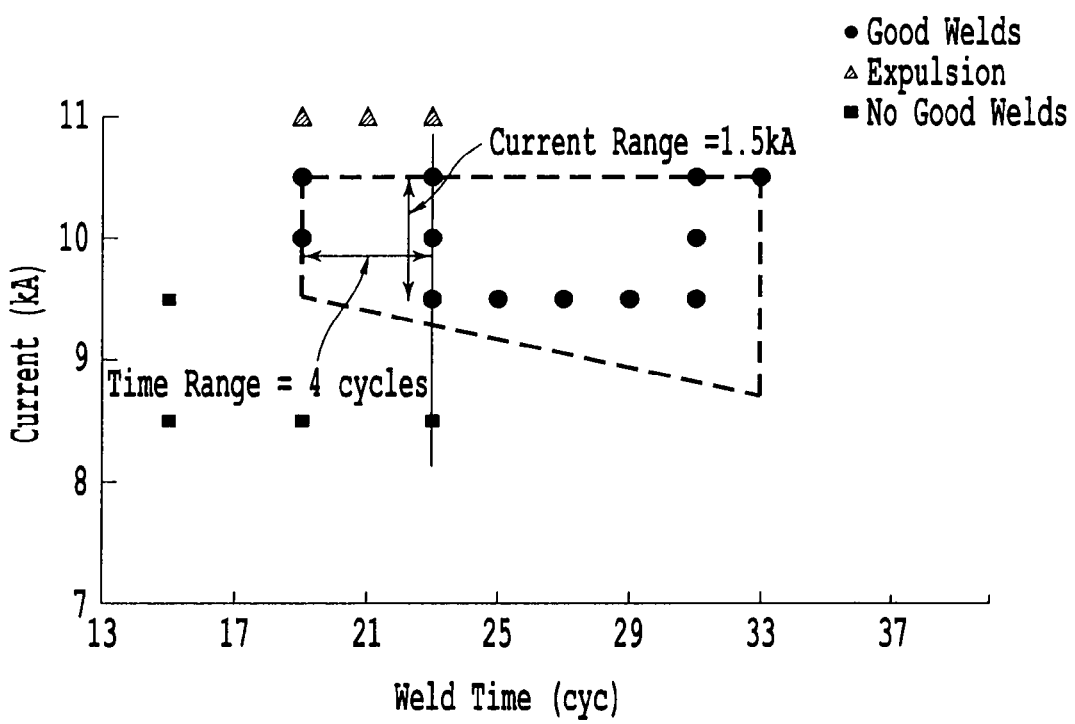
FIG. 5 illustrates an operating window not meeting predetermined conditions according to an embodiment of the present invention.

According to an embodiment of the present invention, the operating window only includes the region of good welds to the left of the weld time constraint. Measure the current and time range for the operating window. According to a preferred embodiment, the maximum current range should be greater than 2 kA and the maximum time range should be greater than 20 percent of the suggested weld time. If these constraints are met, then go to step 109. Otherwise, go to step 107. FIG. 5 illustrates an operating window which does not meet the maximum current range and maximum time range constraints In step 107, if the pressure is being varied for a first time, then increase the pressure force by 200 N or another predetermined increment, recreate the weld lobe, and repeat steps 103 and 105. If the pressure is not being varied for the first time, then judge whether the window improved (i.e., increased in size) or worsened (i.e., decreased in size) based on the maximum current range and maximum time range constraints disclosed above and vary pressure force in the up or down in intervals of 200 N. Recreate the weld lobe, and repeat steps 103 and 105 until an operating window is generated meeting the maximum current range and maximum time range constraints. When this is accomplished, proceed to step 109.

Figure 6:
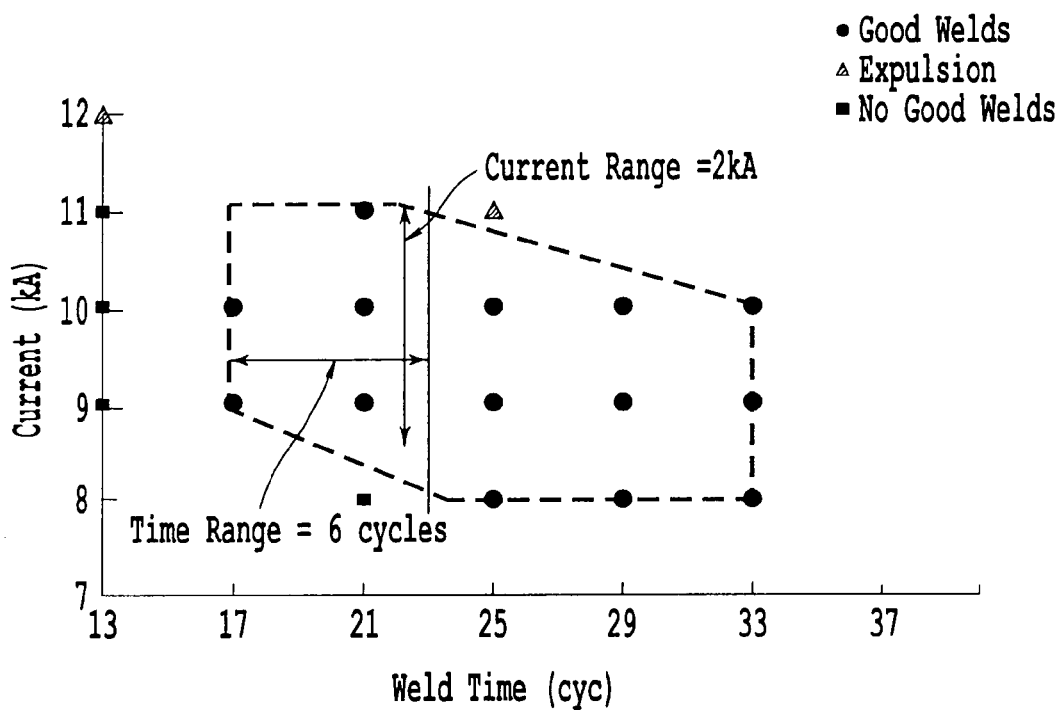
FIG. 6 illustrates an operating window meeting predetermined conditions according to an embodiment of the present invention.

If, after several pressure changes, there is indication that the operating window will not meet the maximum current range and maximum time range constraints, then select the pressure examined with the biggest operating window, and continue to step 111. FIG. 6 illustrates an operating window which does meet the maximum current range and maximum time range constraints.

The inventors discovered that in a preferred but non-limiting embodiment that an ideal location for an optimized weld schedule is a region on the weld lobe that meets the following conditions:
 a. 0.5 kA away from any expulsion;
 b. 1.5 kA away from any bad weld;
 c. within the prescribed weld time constraint of the original schedule; and
 d. 20 percent of the prescribed weld time away from bad welds. (Example: the suggested weld time is 20 cycles, then the ideal location should be at least 4 cycles away from bad welds).

Figure 7:
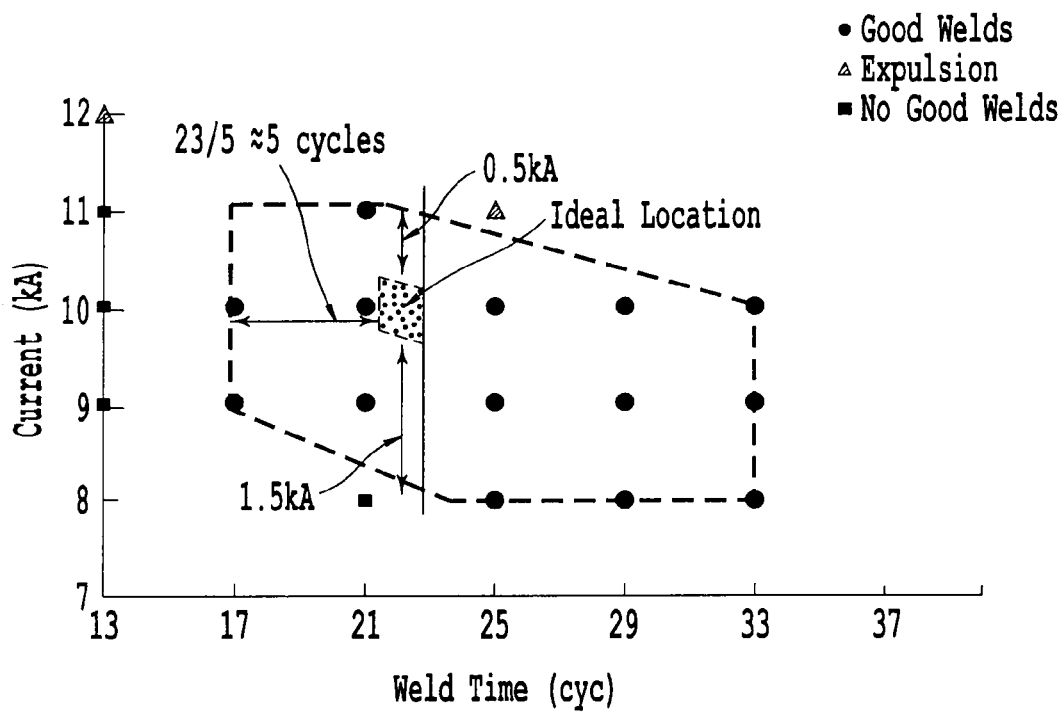
FIG. 7 illustrates identifying a preferred location within the operating window.

See FIG. 7.

Figure 8:
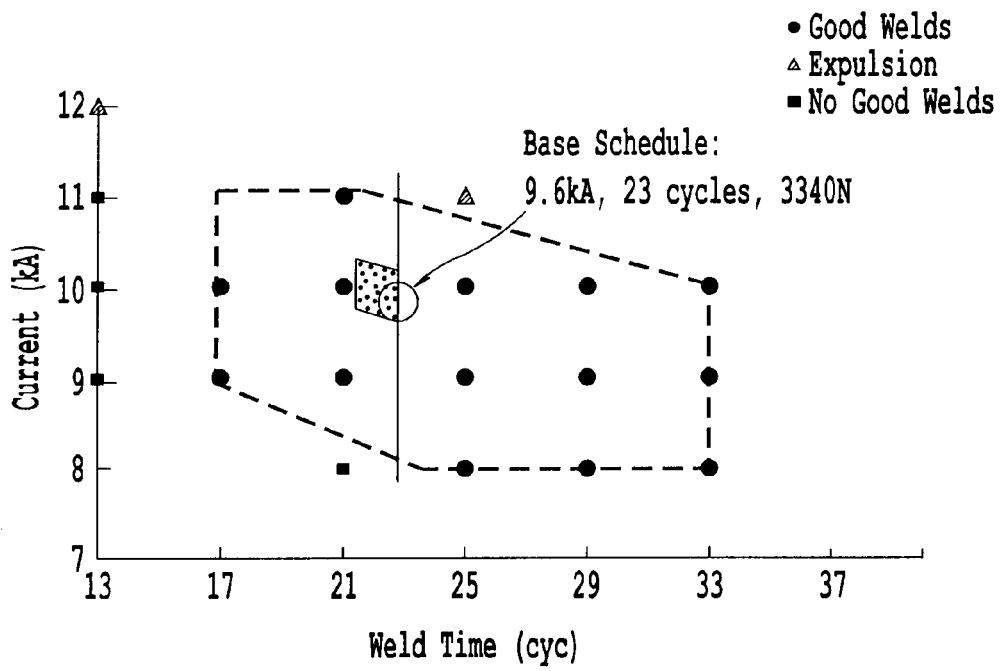
FIG. 8 illustrates identifying a base schedule within the preferred location of the operating window.

If an operating window satisfying the maximum current range and maximum time range constraints is identified in step 107 and an ideal window is identified within the window, then in step 111 select a schedule that is at the very right side of the ideal location, because it is the furthest from bad welds. The selected schedule is the optimum schedule. See FIG. 8. If an operating window satisfying the maximum current range and maximum time range constraints is not identified in step 107, then in step 111 select a schedule from the very right side of the largest operating window not satisfying the constraints. The selected schedule is the optimum schedule.

Figure 9:
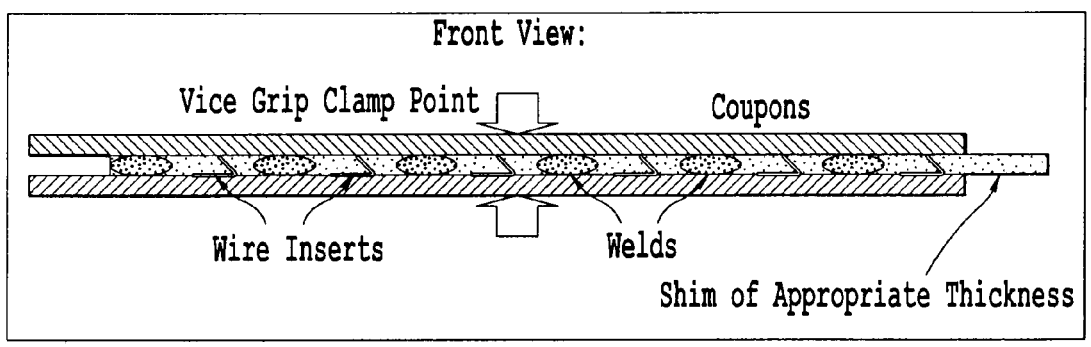
FIG. 9 illustrates a method for testing impulse welding according to an embodiment of the present invention.
Figure 9:
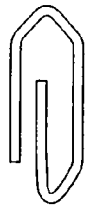
Figure 9:
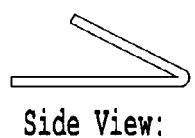
Figure 9:
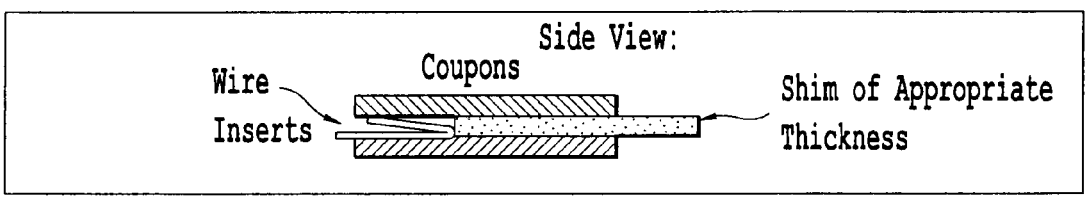

In step 113, impulse welding is tested in order to determine a number of cool cycles to include with the pulses during the optimized weld schedule. According to an embodiment of the present invention, in order to test the impulse welding, a part gap is simulated as shown in FIG. 9.

When implementing the impulse welding, the total weld time should not increase for the reasons discussed above. Therefore, if cool time is added, then actual weld time must be reduced. See the following formula for detail:

Total Cool Time=(Pulse#−1)*Cool Time

Total Weld Time=Actual Weld Time+Total Cool Time

Note, if cool time is 1 cycle, and there are 3 pulses, then the total cool time would be 2 cycles.

To select the appropriate number of pulses and amount of cool times, the following algorithm can be used:
 a. Incrementally add cool time, starting with total cool time of 1 cycle. Try all possible # of pulses before increasing total cool time, however, according to a preferred embodiment of the present invention, do not go above 4 pulses, and stop when any of the following conditions is reached:
  i. expulsion is eliminated, or
  ii. actual weld time drops below the weld lobe. If this occurs and there is still expulsion, reduce current by 0.1 kA and repeat step 2. Note, the current should not decrease below the ideal location boundary.

The following table can be used as a guide for the number of pulses and total cool time combinations. This table should be followed in an ascending manner.

| Total Cool Time | 2 Pulses | 3 Pulses | 4 Pulses |
|---|---|---|---|
| 1 cycle | 1 cool | | |
| 2 cycle | 2 cool | 1 cool | |
| 3 cycle | 3 cool | | 1 cool |
| 4 cycle | 4 cool | 2 cool | |
| 5 cycle | 5 cool | | |
| 6 cycle | 6 cool | 3 cool | 2 cool |

To determine the appropriate individual pulse durations, the following formulas can be used:

First Pulse Duration = (Actual Weld Time)/(# of Pulses) + Remainder

The result of this division is rounded down to the nearest integer

Second Pulse Duration = (Actual Weld Time)/(# of Pulses)

Due to most weld controller limitations, pulses after the second pulse repeat the duration of the second pulse. For example:
Total weld time=23 cycles
Total cool time=4 cycles
Number of pulses=3

First pulse duration=(23−4)/3+remainder=19/3+remainder=6+1=7 cycles

Second and Third pulse duration=(23−4)/3=6 cycles

An example of data obtained by the inventors applying the method of the present invention is provided below:

Example

Base Schedule: 9.6 kA, 23 cycles, 3340N (From step 111)
Incrementally add cool time:

| Trial Order | Total Cool Time | Cool Time | # of Pulses | Expulsion? |
|---|---|---|---|---|
| 1 | 1 | 1 | 2 | Yes |
| 2 | 2 | 2 | 2 | Yes |
| 3 | 2 | 1 | 3 | Yes |
| 4 | 3 | 3 | 2 | Yes |
| 5 | 3 | 1 | 4 | Yes |
| 6 | 4 | 4 | 2 | Yes |
| 7 | 4 | 2 | 3 | No |

Final Spatter-Less Schedule:
Current: 9.6 kA
Number of Pulses: 3 pulses
Cool times: 2 cool cycles in between pulses, total cool time of 4 cycles
Weld time: total weld time 23 cycles, individual pulse times→7 cycles, 6 cycles, 6 cycles
Pressure: 3340N Although less practical than a 2D lobe, according to an embodiment of the present invention, a 3D weld lobe (current, pressure, and time) based on the heat equation $Q\alpha(I^2 t)/P$ can be generated. See e.g., FIG. 10. This would allow for simultaneously finding the optimal spatter-less weld schedule with the largest operating window, (i.e., the window having the most distance between expulsion and separation). However, to create a 3D weld lobe takes a considerable amount of time. Due to this time constraint, as described above a preexisting schedule can be used to create a 2D weld lobe, varying current and time. Using the visual results of this lobe, a different pressure can be chosen for study until an adequate optimal spatter-less weld schedule is found.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for optimizing a schedule for impulse welding, comprising:
   generating a weld lobe using a preexisting welding schedule, the schedule prescribing a current, a weld time, and a pressure;
   identifying an operating window on the weld lobe;
   analyzing the operating window, the analysis including
      determining a maximum time range of the operating window, and
      determining a maximum current range of the operating window;
   until (i) the determined maximum time range of the operating window is greater than a predetermined percentage of the prescribed weld time of the schedule and (ii) the determined maximum current range is greater than the prescribed current of the schedule, creating additional weld lobes by varying the pressure and repeating the identifying an operating window and the analyzing the operating window steps; and
   selecting, within the operating window satisfying conditions (i) and (ii), a second schedule including a second weld time, a second current, and a second pressure.

2. The method of claim 1, wherein the maximum time range of the operating window is determined by calculating the difference in time between a weld encompassed by the operating window having the shortest weld time and the weld time of the schedule.

3. The method of claim 1, wherein the maximum current range of the operating window is determined by calculating the difference in current between a weld encompassed by the operating window having the lowest current and a weld encompassed by the operating window have the largest current.

4. The method of claim 1, wherein the predetermined percentage is 20%.

5. The method of claim 1, wherein:
   the generating a weld lobe step includes identifying good welds, bad welds, and welds having expulsion; and
   the selecting step includes identifying a region within the operating window satisfying conditions (i) and (ii), the region being at least 0.5 kA away from welds having expulsion, at least 1.5 kA away from bad welds, and at least a predetermined percentage of the prescribed weld time away from the bad welds.

6. The method of claim 5, wherein the predetermined percentage is 20%.

7. The method of claim 5, wherein the selecting a second schedule step further includes:
   selecting a schedule within the identified region which is farthest from the bad welds.

8. The method of claim 1, further comprising determining a number of pulses and cool cycles to be included in the second weld time.

9. The method of claim 1, wherein the operating window encompasses each weld not having expulsion and generated with a weld time less than the prescribed weld time of the schedule.

10. The method of claim 8, wherein the determining step includes:
   determining durations of the determined at least one pulses.

* * * * *